(12) United States Patent
Calcatera et al.

(10) Patent No.: US 6,373,007 B1
(45) Date of Patent: Apr. 16, 2002

(54) SERIES AND SHUNT MEMS RF SWITCH

(75) Inventors: Mark C. Calcatera; Christopher D. Lesniak, both of Centerville; Richard E. Strawser, Greenville, all of OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/552,547

(22) Filed: Apr. 19, 2000

(51) Int. Cl.[7] .............................................. H01H 57/00
(52) U.S. Cl. ..................................................... 200/181
(58) Field of Search ........................ 73/514.16, 514.36, 73/514.37; 148/402, 553; 200/181, 259, 168, 160, 512, 61.48, 275, 262–270; 251/129.02; 257/418, 419, 773, 784, 580; 310/309, 328; 330/278, 295, 307; 333/262; 334/55; 337/139, 140; 359/230; 361/233, 234; 385/16, 20

(56) References Cited

U.S. PATENT DOCUMENTS

| | | | |
|---|---|---|---|
| 4,581,624 A | 4/1986 | O'Connor | 357/26 |
| 4,673,777 A * | 6/1987 | Bai et al. | 200/61.45 R |
| 4,674,180 A | 6/1987 | Zavracky et al. | 29/622 |
| 4,882,933 A | 11/1989 | Petersen et al. | 73/517 R |
| 4,959,515 A | 9/1990 | Zavracky et al. | 200/181 |
| 5,096,279 A | 3/1992 | Hornbeck et al. | 359/230 |
| 5,475,353 A * | 12/1995 | Roshen et al. | 335/78 |
| 5,578,976 A | 11/1996 | Yao | 333/262 |
| 5,635,739 A * | 6/1997 | Grieff et al. | 257/254 |
| 5,654,819 A | 8/1997 | Goossen et al. | 359/291 |
| 5,846,849 A | 12/1998 | Shaw et al. | 438/52 |
| 5,880,921 A | 3/1999 | Tham et al. | 361/233 |
| 6,028,343 A | 2/2000 | Chan et al. | 257/417 |
| 6,160,230 A * | 12/2000 | McMillan et al. | 200/181 |
| 6,218,911 B1 * | 4/2001 | Kong et al. | 333/101 |
| 6,263,736 B1 * | 7/2001 | Thundat et al. | 73/514.36 |

* cited by examiner

Primary Examiner—Michael Friedhofer
(74) Attorney, Agent, or Firm—Gerald B. Hollins; Thomas L. Kundert (57) ABSTRACT

A micromechanical electrical systems (MEMS) metallic micromachined electrical switch usable on the die of an integrated circuit and inside the integrated circuit package for controlling radio frequency signal paths while incurring desirably small signal losses. The switch is of the single pole single throw mechanical type with provision for grounding one open-switch position node in the interest of limiting capacitance coupling across the switch in its open condition. Cantilever beam switch element suspension is included along with normally open and normally closed switch embodiments, electrostatic switch actuation and signal coupling through the closed switch by way of capacitance coupling. Low loss radio frequency operation above one gigahertz in frequency is provided.

22 Claims, 3 Drawing Sheets

SERIES AND SHUNT MEMS RF SWITCH

CROSS REFERENCE TO RELATED PATENT DOCUMENT

The present document is somewhat related to the copending and commonly assigned patent application document "SHUNTED MULTIPLE THROW MEMS RF SWITCH", AFD 00427, Ser. No. 09/552,030 filed of even date herewith. The contents of this related application are hereby incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

This invention relates to the field of small mechanical metallic electrical switches, i.e., micromechanical electrical switches (MEMS) of the type usable for low loss switching in a radio frequency integrated circuit device.

In view of the signal power losses and often encountered with the use of semiconductor switch devices in electronic systems operated in the microwave and gigahertz spectral regions (i.e., losses occurring in both the open and closed switch conditions) it is often desirable to resort to simple mechanical switching devices to accomplish signal path changes in such systems. This election is frequently complicated, however, by the need to accomplish such switching within the package of an integrated circuit device and in an environment wherein signals are communicated along paths comprising an electrical transmission line. Further complications arise from the often high operating speed combined with need for a long operating life from such switches and from the need to employ switch fabrication materials compatible with the processing steps and the specific materials used during wafer fabrication for an integrated circuit device. The actuation mechanism for such switching devices gives rise to additional areas of concern since clearly the magnetic actuation arrangements frequently used in other switching environments is all but unavailable in the limited space and limited materials environments of an integrated circuit device.

The present invention is believed to offer a mechanical switching device of the MEMS i.e., micromechanical electrical systems type, a basic single pole single throw switch accommodating several of these complications, providing low switch input to output stray coupling and advancing the art of MEMS integrated circuit switching to a new level.

SUMMARY OF THE INVENTION

The present invention provides a die mounted externally controllable microminiature electrically energized electrical switch or relay usable in the circuitry of an integrated circuit die, and mounted within the integrated circuit package, for circuit path change purposes.

It is an object of the present invention, therefore, to provide an integrated circuit-compatible metallic electrical switch.

It is another object of the present invention to provide an integrated circuit-compatible metallic electrical switch of the single pole single throw type.

It is an object of the present invention to provide an integrated circuit-compatible metallic electrical switch of the shunted single pole single throw type.

It is an object of the present invention to provide an integrated circuit-compatible metallic electrical switch having one switch node selectably connectable with either a switch output node or a signal grounding shunt.

It is an object of the present invention to provide an integrated circuit-compatible metallic electrical switch of the single pole single throw and either normally open or normally closed type.

It is another object of the invention to provide an electrically controllable electrical switch, a switch having certain attributes of an electrical relay.

It is another object of the invention to provide an electrical switch compatible with the components and processes used in an integrated circuit device.

It is another object of the invention to provide an electrical switch well suited to the switching of radio frequency electrical energy in an integrated circuit die.

It is another object of the invention to provide an electrical switch especially suited for use in an integrated circuit electrical transmission line environment.

It is another object of the invention to provide an electrical switch employing capacitance coupling connection between input and output electrodes of the closed switch.

It is another object of the invention to provide an electrical switch having movable and plural fixed metallic members, members all formable with integrated circuit processing techniques.

It is another object of the invention to provide an electrical switch having a movable member physically restrained in each of its open and closed operating positions.

It is another object of the invention to provide an integrated circuit electromechanical switch having a physical component operating life measured in the ten to the ninth power and greater range.

It is another object of the invention to provide a metallic element electrical switch having operating cycle times measured in the range of microseconds.

It is another object of the invention to provide an electrical switch in which capacitance coupling through the electrodes of an open state switch is minimized.

It is another object of the invention to provide an electrical switch in which capacitance coupling between switch-open electrodes is minimized through a shunt grounding of the movable switch element in its open-switch condition.

It is another object of the invention to provide an integrated circuit-compatible micro electromechanical systems (MEMS) switch.

It is another object of the invention to provide a micro electromechanical systems (MEMS) switch of the micromachined electromechanical radio frequency type.

It is another object of the invention to provide a MEMS electrical switch having improved isolation, low electrical loss, high operating speed, low activation voltage and improved manufacturability.

It is another object of the invention to provide a MEMS electrical switch having decreased insertion loss and improved isolation at frequencies above 1 gigahertz in comparison with a comparable transistor or diode switch.

Additional objects and features of the invention will be understood from the following description and claims and the accompanying drawings.

These and other objects of the invention are achieved by the method of performing electrical switching in a metallic conductor signal path of a radio frequency integrated circuit electrical device, said method comprising the steps of:

interrupting a lengthwise extent of said signal path with a movable metallic conductor-inclusive electrical switching member having said movable metallic conductor selectably disposable by incorporated spring tension in one of an electrically open switching position and an electrically closed switching position;

changing said switching member movable metallic conductor switching position with electrostatic force generated by an electrical potential switch control signal;

limiting spring tension urged movable metallic conductor movement arc and switch element spacing gap of said movable metallic conductor electrical switching member with a metal stopping member selectively disposed along a switch position-changing swing path thereof;

coupling radio frequency electrical signal between said movable metallic conductor-inclusive electrical switching member and a switch output conductor member using increased electrical capacitance coupling achieved between said members in said electrically closed switching position;

limiting capacitance-accomplished electrical signal coupling between said movable metallic conductor electrical switching member and said switch output conductor member by grounding said movable metallic conductor electrical switching member to a grounded electrical potential metal stopping member in said switch electrically open position.

DETAILED DESCRIPTION

The characteristics of a radio frequency electrical switch are often significant in a switch's operating environment when the switch is disposed in each of its operating states. A mechanical radio frequency electrical switch, for example, should provide high isolation between the movable or lever switch element and the fixed position switch element when the switch is positioned in the open circuit or "Off" state and should additionally provide low insertion losses between movable or lever switch element and fixed position element when disposed in the closed or "On" state of the switch. Radio frequency switches using transistors or diodes similarly have both "Off" and "On" state characteristics of concern in many switch applications. Such semiconductor switches, even though often less than ideal, are widely employed in microwave and millimeter wave integrated circuits in applications such as signal routing and impedance matching networks. In applications above one gigahertz in operating frequency however, solid state switches have unduly large insertion losses, losses in the order of 1 dB, in the "On" state and poor isolation in the "Off" state, typically isolation no better than −30 dB and are somewhat fragile in their ability to tolerate electrical and physical abuses. MEMS radio frequency switches, i.e., micromechanical electrical systems radio frequency switches as discussed in the present document, are a significantly lower loss alternative to such diode and transistor semiconductor switches for many switching applications above 1 GHz.

Figure 1:
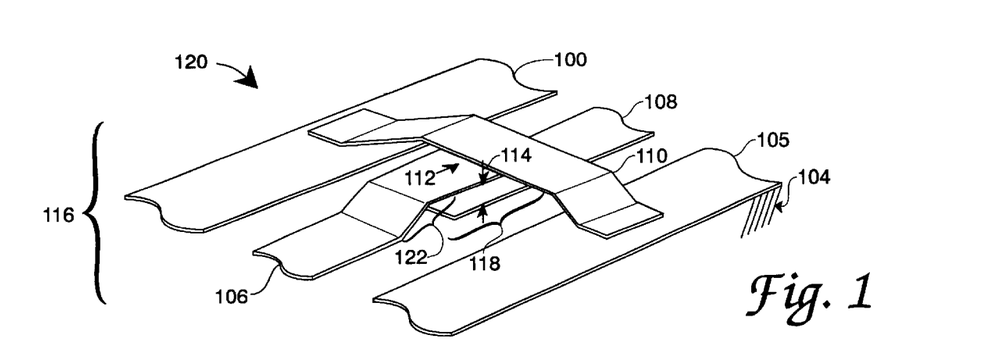
FIG. 1 shows a three dimensional perspective view of a MEMS integrated circuit electrical switch according to the present invention.

FIG. 1 in the drawings, therefore, shows a three dimensional perspective view of a first MEMS metallic integrated circuit electrical switch according to the present invention. In the FIG. 1 switch a pair of grounded metallic conductors 100 and 105 of a transmission line 116, a "coplanar transmission line" form of transmission line, are shown parallel disposed across the surface of a substrate-supported multiple layer integrated circuit die of a semiconductor wafer. In the FIG. 1 drawing the substrate and its multiple layers of semiconductor materials (usually containing transistors and other electronic hardware apparatus) are indicated generally at 104. The conductors 100 and 105 may comprise any of numerous conductor types known in the art for use in integrated circuit devices; these conductors may, for example, be made from such integrated circuit metallization materials as aluminum, gold, titanium, platinum and copper.

Two additional metallic conductors of the FIG. 1 transmission line 116, i.e., switch input and output path conductors, are shown at 106 and 108 in the FIG. 1 drawing. The conductors 106 and 108 are preferably disposed in axial alignment with each other and located centrally intermediate the grounded conductors 100 and 105 to comprise the coplanar transmission line structure. In the conductor disposition shown in FIG. 1 the conductors 106 and 108 overlap each other in their lengthwise central portion in region 118 and are separated by a distance such as two to five microns in the vertical direction indicated by the gap 114. In this separated conductor condition the FIG. 1 switch 120 is, of course, in the electrically "Off" condition. Additionally shown in the FIG. 1 drawing is a raised center span metallic bridge, or upper air bridge, or microbridge-short or more simply the backstop member 110 extending between the pair of parallel disposed metallic transmission line ground conductor members 100 and 105. The metallic backstop member 110 is connected to a signal ground node in the FIG. 1 integrated circuit by way of the grounded transmission line conductors 100 and 105.

In the FIG. 1 position of the switch 120, the movable arm portion at 122 is shown in contact with the backstop member 110 and this arm portion is, therefore, held in the zero volt signal condition. This movable arm portion 122 of conductor 106 may be connected to either a source of radio frequency signal during use of the FIG. 1 switch or may be connected to the input node of some portion of the integrated circuit electrical apparatus such as to the input of a radio frequency amplifier circuit. In both of these configurations the grounded connection of the movable arm portion 122 of conductor 106 serves a useful purpose in limiting or eliminating capacitance coupling effects between the conductors 106 and 108 while the switch is disposed in the FIG. 1 open switch status. In the former switch configuration the grounded movable arm portion of the conductor 106 provides a shunt loading of the signal source connected to the movable arm portion 122 while in the latter configuration grounding the movable arm portion 122 and the input node of some element of the integrated circuit electrical apparatus can preclude stray signal coupling into an amplifier input port and other undesirable operating conditions.

Maintenance of the FIG. 1 switch in the illustrated open configuration is preferably accomplished through action of spring tension resident in the movable arm portion 122 of the conductor 106 from its time of fabrication. Such metal conductors can be fabricated by metal deposition techniques known in the art using photoresist masking, masking which may be formed in several layers to realize the multiple layers present in the FIG. 1 switch lengthwise central portion of region 118. Such metal deposition fabrication of the movable arm portion 122 of the conductor 106 tends to leave residual stress in the deposited metal, stress which causes the conductor of the movable arm portion 122 to curl into an upward directed condition if not otherwise restrained—as appears in the FIG. 3 drawing herein and is additionally discussed below herein. The spring tension of this curling, therefore, provides a useful function in the present invention by enabling the movable arm to backstop-contacting quiescent state shown in FIG. 1. The upper microbridge or backstop member 110 also limits the amount of vertical deflection of the cantilever beam movable arm portion 122 and allows for a low dc switch actuation voltage.

Control of residual stress in the movable arm portion 122 is a characteristic to be considered in fabricating the FIG. 1 switch. In addition to other involved factors, higher residual stress in the cantilever beam metal shortens the release time of the switch, and enables faster switching speed. Residual stress in the cantilever beam is also believed a contributor to determination of achievable operating life in a fabricated switch. Switches employing the dimensions disclosed in connection with FIG. 2 herein have, for example, been found capable of operating life in excess of 10E9 or $10^9$ operating cycles and an operating life in the 10E12 cycle range is believed possible. Such techniques as selecting physical dimensions of the movable arm portion 122, selecting the metals employed and controlling the deposition conditions may be used in selecting the residual stress achieved in a particular embodiment of the switch invention.

The electrostatically actuated MEMS switch of the present invention, therefore, relies on residual stress in the movable arm portion 122, and the spring constant of movable arm portion 122, to relax the switch when the dc actuation voltage is removed. Since the force developed by the spring characteristics of the movable arm portion 122 must be overcome by the switch actuating electrostatic force in closing the switch, low actuation voltage switches tend to call for a low spring constant and, in the absence of any compensating factors, incur the "expense" of slower release time characteristics. The herein disclosed arrangement of the switch, however, emphasizes the use of greater metal stress to provide a high spring constant and fast release time, with the upper microbridge or backstop member 110 then offering lowered dc actuation voltages by way of switch gap limitation and also providing high signal isolation between switch contacts.

Since the selection of switch element physical dimensions is also a consideration in determining the characteristic impedance of the FIG. 1 switch, as is discussed in another portion of this specification, techniques involving a multiple variable approach and inclusion of these several dimension-determining influences are appropriate to final determination of switch element dimensions. Compromise, as is known in the art, between these several dimension-determining influences is possibly appropriate in determining optimum switch dimensions for a given application.

The gap 114 between movable arm portion 122 and fixed position conductor 108, i.e., the gap between switch input and output conductors in the FIG. 1 drawing, relates to several additional significant characteristics of the FIG. 1 switch. One of these characteristics concerns the effective capacitance coupling present between conductors 106 and 108 when the switch is in the FIG. 1 open state. Notwithstanding the preferred grounding of the movable arm 122 portion of the switch 120 by way of the backstop member 110 as described above, capacitance coupling between switch input and output conductors is nevertheless present and small signals may also be present on one of the switch conductors as a result of non zero effective impedance in the backstop member 110 ground circuit and the relatively high, gigahertz, frequencies contemplated for the FIG. 1 switch.

The gap 114 is also significant with respect to determination of the electrostatic force needed for closing the FIG. 1 switch during use. This electrostatic force is generated by application of an electrical potential between the conductors 106 and 108, a potential comprised of a direct current bias potential in combination with a radio frequency signal for example. Although mathematical expressions relating separation distance, applied voltage and generated force in an electrostatic force environment are known in the art, generally the larger the gap 114 is made the lower the force between conductors 106 and 108 for a given bias voltage between conductors. This simple relationship, in fact, provides one justification for use of the backstop member 110 in the FIG. 1 switch, i.e., limitation of the gap 114 by the backstop member 110 serves to limit the voltage needed to close the switch 120. In addition to these capacitance coupling and energization voltage related aspects of the gap 114 this gap is also determinative of the breakdown limited maximum signal and bias voltages usable between conductors 106 and 108 when the switch 120 is in the FIG. 1 open configuration. In view of the shunted to ground condition of the conductor 106 and its movable arm portion 122 when the FIG. 1 switch is in the illustrated shunted open switch position, the signal and bias voltage needed to accomplish switch closure should appear on the conductor 108 and comprise a potential with respect to ground potential.

Figures 2, 3:
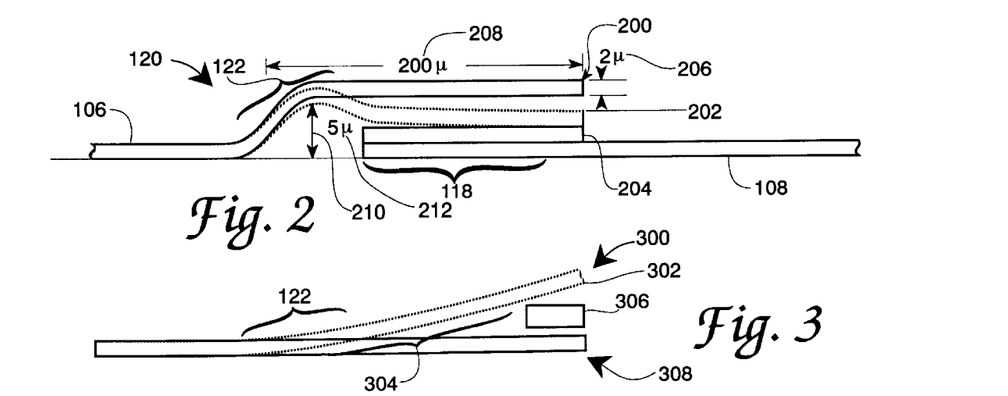
FIG. 2 shows an elevation view of a MEMS switch of the FIG. 1 type.
FIG. 3 shows additional features according to the present invention for the FIG. 1 and FIG. 2 switches.

FIG. 2 in the drawings shows an elevation view of a MEMS switch of the FIG. 1 type when the switch is disposed in an electrically "On" condition. In the FIG. 2 drawing the identification numbers assigned in the FIG. 1 drawing are reused to the best degree possible with new numbers in the two hundred series also being used as needed. In the FIG. 2 drawing the spring urged movable arm portion 122 of the switch 120 is shown to be in its deformed or non relaxed condition as is indicated by the number 202. The FIG. 1 relaxed condition of the movable arm portion 122 is indicated at 200 in the FIG. 2 drawing.

In the FIG. 2 deformed condition of the movable arm portion 122 it may be noted that this arm portion comes to rest on an intermediate member, an insulating member 204, located between the conductors 106 and 108. Presence of this intermediate insulating member 204 in the FIG. 1 and FIG. 2 switch 120 is in keeping with the fact that this switch is preferably operated in a capacitance-coupled mode rather than in the conventional ohmic connection mode between switch conductors. Indeed it is use of this capacitance coupled operating mode which enables the maintenance of a continuous electrostatic force generating voltage across the contacts 106 and 108 when the switch is in the FIG. 2 closed or "On" configuration. Without such capacitance coupling the electrostatic force voltage would of course disappear with closure of the switch contacts and the switch conductors would operate in something of an oscillatory cycle. The intermediate insulating member 204 may be comprised of silicon nitride material of thickness in the range of two tenths to one quarter micron for example.

In this capacitance-coupled operating mode of switch 120 it is of course the difference between conductor 106 to conductor 108 capacitance coupling in the conductor overlap of region 118 which determines the switch output signal difference between the "Off" and "On" switch configurations. Indeed this capacitance difference dependency standing alone suggests making the open switch gap 114 in FIG. 1 as large as possible in order to achieve the greatest degree of capacitance change in the FIG. 2 switch configuration. This dependence on capacitance coupling and capacitance coupling change also suggests making the overlapping parts of the FIG. 2 switch conductors, the parts indicated in region 118 in FIG. 1 and FIG. 2, as large as possible in both length and width dimensions. In a similar manner it is desirable for the insulating member 204 to have the smallest thickness possible in order to maximize the closed switch capacitance coupling. At the microwave or other radio frequencies contemplated for use of the present invention switch however small capacitance values between "closed" contacts of the switch are sufficient for significant signal power transfer through the switch. At a frequency of 10 gigahertz, for example, a capacitance of 10 picofarads between "closed" contacts of the switch 120 provides a capacitive reactance of 1.59 ohms, an impedance sufficiently low for effective power transfer through a transmission line of fifty ohms characteristic impedance. In the FIG. 2 position of increased capacitive coupling between switch elements, a capacitance ratio of between fifty and two hundred times that of an open switch operating condition prevails.

Figure 4:
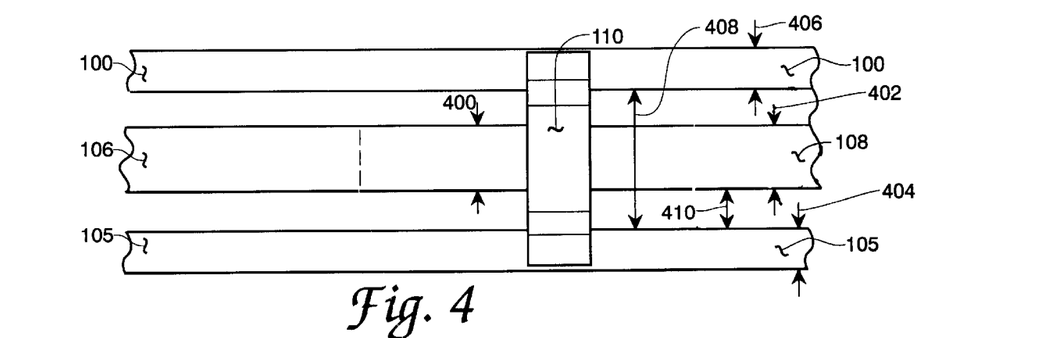
FIG. 4 shows a switch of the FIG. 3 type in a contemplated environment including representative switch dimensions.

Usable dimensions for several of these parts are show in the FIG. 2 drawing and include the 200 micron length indicated at 208 for the movable arm 122, insulating member 204 thickness of 100 microns (of silicon nitride or silicon dioxide materials for example), movable arm elevation of 5 microns as indicated at 210, and a metallization thickness dimension of 2 microns as indicated at 206. None of these dimensions is considered especially critical so long as the functions recited herein are maintained; in other words the dimensions shown in FIG. 2 may be considered typical or representative rather than limiting of the invention. The influence of switch dimensions on achievable switch operating life should, however, be considered in switch configurations departing significantly from that represented in FIG. 1 and FIG. 2. FIG. 4 in the drawings also shows switch dimensions, dimensions having characteristic impedance significance as is discussed subsequently herein.

Notably the FIG. 2 drawing does not show the FIG. 1 backstop member 110 nor the expected behavior of the movable arm portion 122 in the absence of this backstop member 110; such omissions are believed enabling of a less cluttered and more easily understood FIG. 2 drawing and its additions to the invention. FIG. 3 in the drawings corrects this FIG. 1 omission by showing an elevation cross sectional view of both the backstop member 110 and the movable arm portion 122 as the arm portion 122 would exist in the absence of backstop member 110. In the FIG. 3 drawing, therefore, the movable arm portion 122 is shown in dotted line form at 300 to be in the position it would assume in a switch open operating condition without the presence of backstop member 110. The curvature at 304 in the movable arm portion 122 in FIG. 3 indicates the degree of spring tension remaining in the arm after its fabrication and also suggests the force required from the electrostatic potential applied across switch 120 to achieve switch closure. In fact with the elevation plane switch element dimensions shown in FIG. 2 and with a movable arm portion 122 of some 50 microns width in its lateral direction (in the direction represented at 400 in FIG. 4) the achieved spring tension force tending to generate the FIG. 3 illustrated curvature at 304 is believed to be in the range of 0.4 to 1.8 micronewtons.

FIG. 3 also provides a second view of the FIG. 1 switch 120 with the movable arm portion 122 in the open switch position, the position represented at 302 in FIG. 3 wherein contact between the movable arm portion 122 and the backstop member 110 tends to occur. As may be observed in the FIG. 3 drawing, the cross sectional size of the backstop member 110 is preferably made sufficiently large to prevent its deformation from spring tension in the movable arm portion 122 or from die handling during a fabrication process. Usable width and height dimensions for the backstop member bridging or suspended portion at 306 are 100 microns and ten microns respectively in a switch having the other dimensions recited above. The movable arm portions 122 representation at 308 in FIG. 8 indicates the more normal switch condition wherein movable arm portions 122 is held "captive" by the backstop member 110 and is in at least a partially closed switch condition.

FIG. 4 in the drawings shows a plan view of a switch of the FIGS. 1–3 type in a contemplated environment and also shows additional representative switch-related dimensions. In the FIG. 4 drawing the grounded transmission line conductors 100 and 105 of FIG. 1 are shown on either side of the switch-joined conductors 106 and 108 with the grounded conductors 100 and 105, providing both electrical continuity and physical support for the backstop member 110. Representative dimensions appear at 404 and 406 in the FIG. 4 drawing for the grounded transmission line conductors 100 and 105 and at 400 and 402 for the switch-joined conductors 106 and 108. For the case of a transmission line of fifty ohm characteristic impedance employing the FIG. 2 disclosed two micron metal thickness the FIG. 4 dimensions 400, 402, 404 and 406 may have values of 50 microns, 50 microns, 100 microns, and 100 microns respectively. The spacing between conductor 108 and each of conductors 100 and 105 in the FIG. 4 drawing, the spacing 410 in FIG. 4, may be 35 microns. The related length dimension of the backstop member 110 in its bridge portion indicated at 408 may be 115 microns. As is known in the transmission line art, the FIG. 4 dimensions are interrelated in nature and may be altered as a set, to a limited degree while maintaining a selected characteristic impedance; this is of interest in adapting the switch of the invention to a differing integrated circuit geometry for example. Differing dimensions may be used to obtain a transmission line of different characteristic impedance as is also known in the art.

Figure 6:
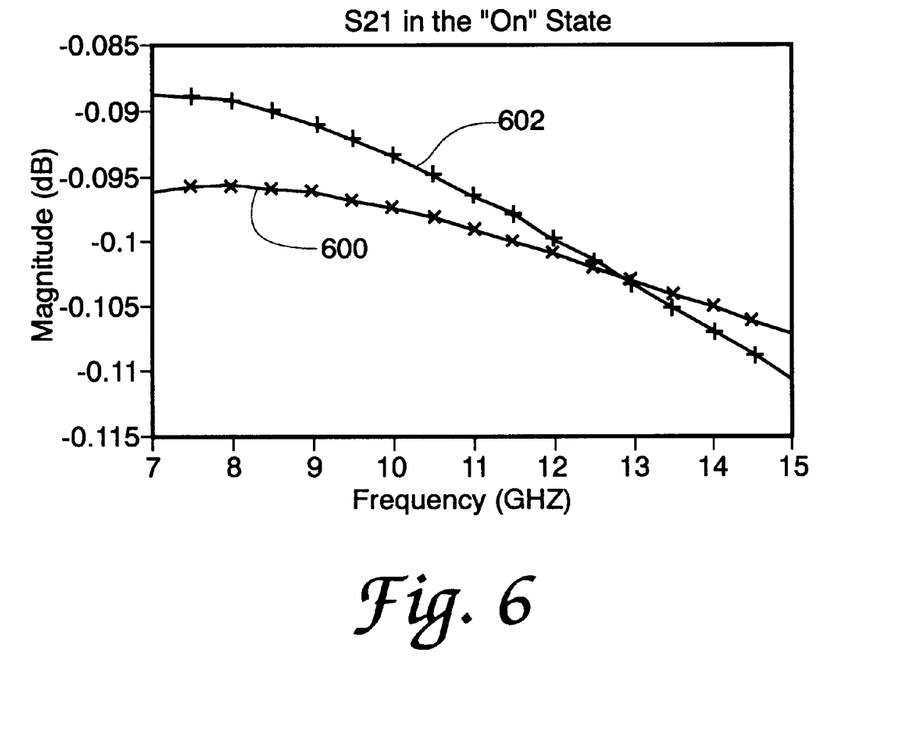
FIG. 6 shows "ON" state losses for the present invention MEMS switch and a partly similar previous arrangement MEMS switch.

The grounded bridge contact or backstop member 110 provides a notable contribution to the MEMS RF switch of FIGS. 1–4. One aspect of this contribution is a significant increase in the switch input to output isolation when the switch is in the "Off" state. This isolation is present while maintaining an insertion loss increased only by about 0.007 dB or less over a similar switch not having a grounded bridge. This comparison is relevant at least between the frequencies of 7 and 15 gigahertz as shown in FIG. 6 of the drawings. The FIG. 6 curves each represent simulation-determined S-parameter "On" state isolation for a switch generally present invention type. The FIG. 6 indicated S21 parameter represents the isolation occurring between a signal applied at one port of a switch (port 2 or the conductor 106 in FIG. 1 for example) and the signal measured at the other port of the switch, (port 1 or the conductor 108 in FIG. 1 for example). The relatively low isolation magnitudes represented in FIG. 6 indicate most of the port 2 applied signal reaches the port 1 switch output as desired. In FIG. 6 the lowermost curve at 600 relates to a switch having the backstop member 110, i.e., a switch of the present invention type and the decreased isolation or decreased loss upper curve at 602 a similar conventional switch, a switch without the backstop member 110 present. In FIG. 6 the additional loss resulting from backstop member 110 presence is small at its worst and becomes an advantage above 13 gigahertz.

Figure 7:
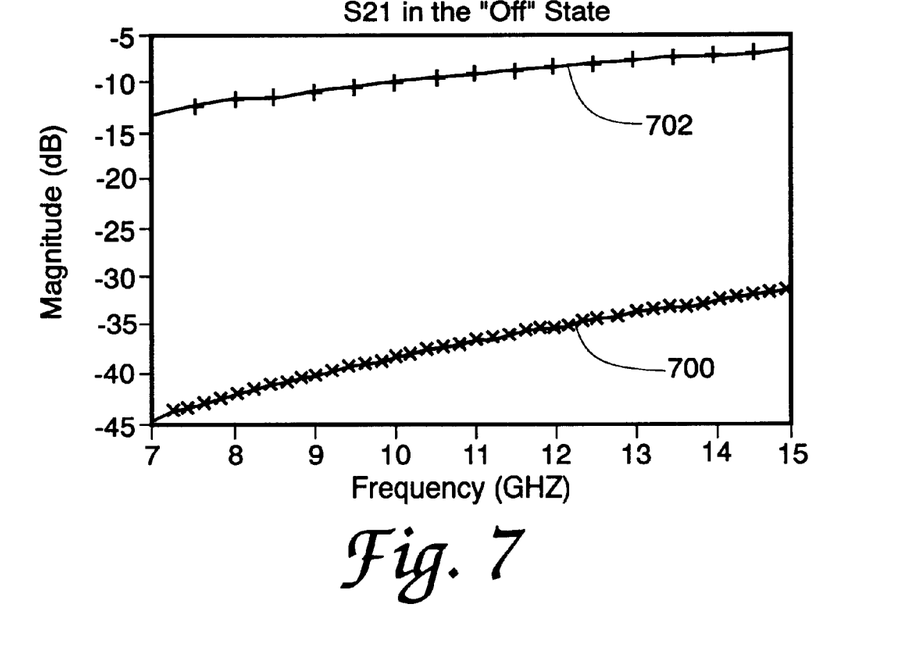
FIG. 7 shows "OFF" state losses for the present invention MEMS switch and a partly similar previous arrangement MEMS switch.

The FIG. 7 curves each represent simulation-determined S-parameter "Off" state isolation for a switch of the present general type. The lowermost FIG. 7 curve at 700 relates to a present invention switch having the backstop member 110 present, i.e., a switch of desirably great input to output port isolation in its open state. The FIG. 7 upper curve at 702 relates to a more conventional switch without the shunting benefits of the present invention backstop member 110, a switch having significantly decreased isolation, 30 dB decreased isolation between input and output ports while in its "Off" state.

In summary the FIG. 1 through FIG. 4 embodiment of the invention provides a MEMS RF switch having a cantilever beam member anchored on one end to a substrate and positioned above a contact along it's free end length. A grounded bridge contact positioned at the free end and above the cantilever beam makes contact with the top of the beam when the switch is in the up or "Off" or shunted open state. The grounded bridge contact above the cantilever beam provides improved isolation and low loss characteristics for the RF switch. In addition, the switch relies upon the intrinsic residual stress gradient of metallization used to form the cantilever beam to cause the beam to curl upwards and contact the grounded microbridge when the switch is in the "OFF" position. The microbridge limits the upward deflection of the cantilever, allowing it to be electrostatically actuated to the down, or "ON" position with a low dc voltage of less than twenty five volts. The actuation voltage is preferably applied to the fixed or non-cantilever switch contact.

Figure 5:
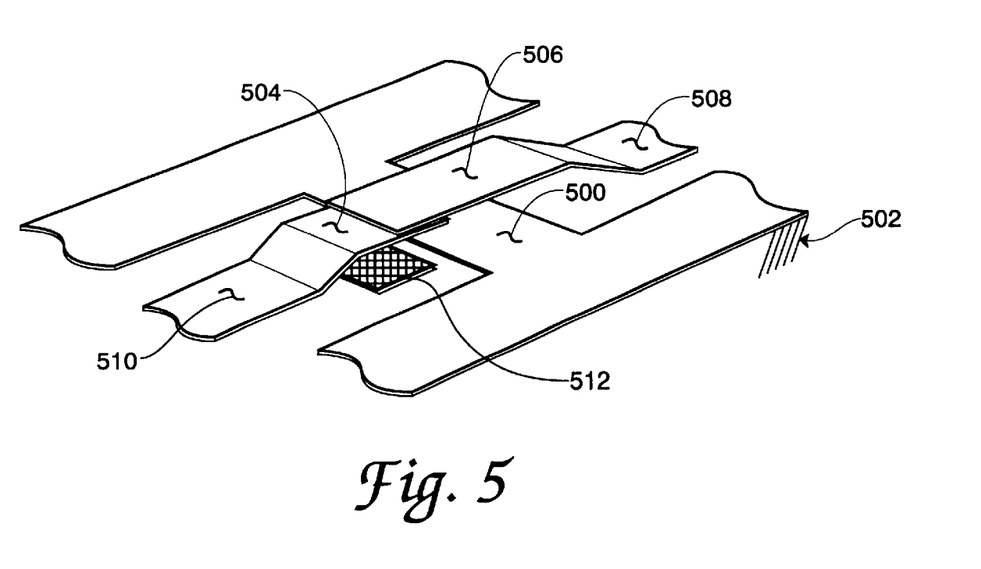
FIG. 5 shows another arrangement of a MEMS switch according to the invention.

FIG. 5 in the drawings shows a three dimensional perspective view of a second MEMS metallic integrated circuit electrical switch according to the present invention. The FIG. 5 switch is also a series-shunt MEMS switch, however, this switch differs in several respects from the above described switch of FIG. 1 through FIG. 4. A first blush difference in the FIG. 5 switch concerns the fact that the shunt ground conductor, the conductor 500 in FIG. 5, is not implemented in the form of a microbridge or the backstop member 110 in FIG. 1. Instead, the ground conductor 500 in the FIG. 5 switch is completely planar in nature and resides on the switch substrate 502. Additionally, in the FIG. 5 switch one switch element, the movable cantilever arm 504, which preferably connects with a radio frequency signal feed such as conductor 510, makes contact with the ground 500 when it is pulled down into the switch "Off" state. When in the up or "On" state, the cantilever arm 504 is in contact with a microbridge element 506 connected to the transmission line output conductor 508. The FIG. 5 switch implementation is, therefore, different in that the switch is normally in the "On" state and must be activated, or the movable cantilever arm 504 pulled down, to be in the "Off" state.

Another difference in the FIG. 5 switch concerns the presence of a pull-down electrode 512 in the FIG. 5 switch. In the environment of a fifty ohm characteristic impedance for the conductors 508 and 510 a significant current flow, i.e., a current near one half ampere, through a resistive load connected with the FIG. 5 switch would be required in order to develop a twenty five volt switch actuation voltage on the switch electrodes themselves-in the manner of the FIG. 1 switch. (If each of the conductors 508 and 510 is connected to a resistive impedance of fifty ohms a twenty five volt pull-down voltage requires a one ampere total current flow through the paralleled resistive impedances.) Use of the pull-down electrode 512 enables the switch actuation voltage to be applied between electrode 512 and the movable conductor 510 without incurring current flows of this magnitude.

The pull-down electrode 512 may consist of a thin layer of metal received on a surface layer of electrical insulation ultimately supported by substrate 502. This thin layer of metal is preferably covered by a thin layer of insulating material such as silicon nitride, a layer of about two tenths of a micron thickness. Electrical signal to accomplish FIG. 5 switch actuation may be applied to the thin layer of metal by way of a conductive path of similar metal or by way of an electrically resistive path leading into the electrode 512.

Even though the switch of FIG. 5 may therefore be considered to be a "normally ON" switch and the FIG. 1 through FIG. 4 switch a "normally OFF" switch the switching performance of each configuration is similar. Both switches have the desired low insertion loss and high isolation characteristics and each has similar movable element dimensions, spring constant considerations and actuation force and voltage needs. The FIG. 5 switch arrangement can require additional not shown physical support for the bridge element 506 in some instances, however, this can be provided by conventional integrated circuit techniques. The "normally ON" characteristics of the FIG. 5 switch can, of course, be of advantage in electrical circuit uses wherein, for example, maintenance of a signal path is desired even during a non energized state of the apparatus.

The FIG. 5 switch arrangement can also offer operating advantage with respect to electrical impedance inherently present in the backstop member 110 of the FIG. 1 through FIG. 4 switch since in the FIG. 5 arrangement the switch shunting ground conductor is planar, short and direct in disposition rather than having the elevated, inherently greater inductance and higher ground impedance configuration of the FIG. 1 through FIG. 4 switch. This difference can provide an improved signal shunting characteristic over the FIG. 1 through FIG. 4 switch in higher operating frequency, sensitive circuit uses of the FIG. 5 switch.

The FIG. 5 embodiment of the invention therefore provides a MEMS RF switch having a movable first cantilever beam member anchored on one end to a substrate and positioned below a contact along the first cantilever free end. A grounded contact positioned below the first cantilever free end makes contact with the bottom of the beam when the switch is in the shunting, down, or open, or "Off" switch state. The grounded bridge contact below the first cantilever beam provides improved isolation and low loss characteristics for the radio frequency switch. The FIG. 5 switch relies upon the intrinsic residual stress gradient of metallization used to form the first cantilever beam to cause the beam to curl upwards and contact the output conductor microbridge (i.e., a second or fixed cantilever beam) when the switch is in the "ON" position. The microbridge or fixed cantilever beam limits the upward deflection of the first cantilever arm, allowing it to be electrostatically actuated to the down, or "OFF" position with a low dc voltage, a voltage of less than twenty five volts. The actuation voltage is preferably applied to the fixed or second cantilever switch contact.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Integrated circuit radio frequency transmission line metallic mechanical electrical switching apparatus comprising the combination of:

an integrated circuit substrate member;

a plurality of semiconductor material layers disposed on said substrate member, said semiconductor material layers including a plurality of electrical transistor members;

a pair of parallel disposed metallic transmission line ground members traversing an upper surface portion of said semiconductor material layers;

a metallic first radio frequency energy transmission line signal conveying member disposed between said pair of parallel disposed metallic transmission line ground members on said upper surface portion of said semiconductor material layers;

said metallic first radio frequency energy transmission line signal conveying member interconnecting a switch output port location on said surface portion of said semiconductor material layers with one of a transmission line radio frequency source and load member;

a second metallic radio frequency energy transmission line signal conveying member disposed between said pair of parallel disposed metallic transmission line ground members in extended alignment with said first radio frequency energy transmission line signal conveying member;

said second metallic radio frequency energy transmission line signal conveying member including a selectively movable portion extending in overlap with a switch output port location part of said first metallic radio frequency energy transmission line signal conveying member and normally resident in one of:

open switch relaxed spring physical segregation from said upper surface portion of said semiconductor material layers and said substrate member; and closed switch relaxed spring physical segregation from said upper surface portion of said semiconductor material layers and said substrate member and in proximity with an overlapping raised extended portion of said metallic first radio frequency energy transmission line signal conveying member;

a metallic bridge member extending between said pair of parallel disposed metallic transmission line ground members, said bridge member being disposed in one of:

being received on said upper surface portion of said semiconductor material layers and grounding said selectively movable portion of said second metallic radio frequency energy transmission line signal conveying member in a deformed spring, open switch, condition of said second metallic radio frequency energy transmission line signal conveying member; and being a raised center span metallic backstop member extending between said pair of parallel disposed metallic transmission line ground members over said selectively movable portion of said second radio frequency energy transmission line signal conveying member electrostatic force generating electrical potential apparatus connected between said first metallic radio frequency energy transmission line signal conveying member and said second metallic radio frequency energy transmission line signal conveying member and selectively generating a deformed spring electrical potential.

2. The integrated circuit radio frequency transmission line metallic mechanical electrical switching apparatus of claim 1 wherein:

said switching apparatus comprises a normally open electrical switch normally resident in a relaxed spring condition of said second metallic radio frequency energy transmission line signal conveying member selectively movable portion; and said bridge member comprises said raised center span metallic backstop member extending over said selectively movable portion of said second radio frequency energy transmission line signal conveying member engaging and grounding said selectively movable portion of said second metallic radio frequency energy transmission line signal conveying member.

3. The integrated circuit radio frequency transmission line metallic mechanical electrical switching apparatus of claim 1 wherein:

said switching apparatus comprises a normally closed electrical switch normally resident in a relaxed spring condition of said second metallic radio frequency energy transmission line signal conveying member selectively movable portion; and said bridge member is received on said upper surface portion of said semiconductor material layers grounding said selectively movable portion of said second metallic radio frequency energy transmission line signal conveying member in a deformed spring, open switch condition of said second metallic radio frequency energy transmission line signal conveying member.

4. The integrated circuit radio frequency transmission line metallic mechanical electrical switching apparatus of claim 1 wherein said electrostatic force generating electrical potential apparatus comprises a source of direct current electrical in combination with a source of said radio frequency energy.

5. The integrated circuit radio frequency transmission line metallic mechanical electrical switching apparatus of claim 1 wherein said substrate member and said semiconductor material layers are comprised of one of the materials of silicon and gallium arsenide.

6. The integrated circuit radio frequency transmission line metallic mechanical electrical switching apparatus of claim 1 wherein said parallel disposed metallic transmission line ground members and said metallic first and second radio frequency energy transmission line signal conveying members comprise portions of a coplanar transmission line.

7. The integrated circuit radio frequency transmission line metallic mechanical electrical switching apparatus of claim 1 wherein said movable second metallic radio frequency energy transmission line signal conveying member is connected with a source of radio frequency energy.

8. The integrated circuit radio frequency transmission line metallic mechanical electrical switching apparatus of claim 1 wherein said movable second metallic radio frequency energy transmission line signal conveying member is connected with a radio frequency energy load member.

9. The integrated circuit radio frequency transmission line metallic mechanical electrical switching apparatus of claim 1 wherein said electrostatic force generating electrical potential apparatus generates an electrical potential of less than twenty five volts.

10. The integrated circuit radio frequency transmission line metallic mechanical electrical switching apparatus of claim 1 wherein said closed switch operating condition comprises a position of increased capacitive coupling close spacing with respect to said first metallic radio frequency energy transmission line signal conveying member and said position of increased capacitive coupling has a capacitance ratio of between fifty and two hundred times that of an open switch operating condition.

11. The method of performing electrical switching in a metallic conductor signal path of a radio frequency integrated circuit electrical device, said method comprising the steps of:
   interrupting a lengthwise extent of said signal path with a movable metallic conductor-inclusive electrical switching member having said movable metallic conductor selectably disposable by incorporated spring tension in one of an electrically open switching position and an electrically closed switching position;
   changing said switching member movable metallic conductor switching position with electrostatic force generated by an electrical potential switch control signal;
   limiting spring tension urged movable metallic conductor movement arc and switch element spacing gap of said movable metallic conductor electrical switching member with a metal stopping member selectively disposed along a switch position-changing swing path thereof;
   coupling radio frequency electrical signal between said movable metallic conductor-inclusive electrical switching member and a switch output conductor member using increased electrical capacitance coupling achieved between said members in said electrically closed switching position;
   limiting capacitance-accomplished electrical signal coupling between said movable metallic conductor electrical switching member and said switch output conductor member by grounding said movable metallic conductor electrical switching member to a grounded electrical potential metal stopping member in said switch electrically open position.

12. The method of performing electrical switching in a metallic conductor path of a radio frequency integrated circuit electrical device metallic conductor of claim 11 wherein:
   said movable metallic conductor-inclusive electrical switching member quiescently resides in a normally open electrical switching condition;
   said step of limiting spring tension urged movable metallic conductor movement arc and switch element spacing gap includes spring tension urging of said movable metallic conductor away from said switch output conductor member into proximity with an overhanging grounding potential metal stopping member while entering said normally open electrical switching condition.

13. The method of performing electrical switching in a metallic conductor path of a radio frequency integrated circuit electrical device metallic conductor of claim 11 wherein:
   said movable metallic conductor-inclusive electrical switching member quiescently resides in a normally closed electrical switching condition;
   said step of limiting spring tension urged movable metallic conductor movement arc and switch element spacing gap includes spring tension urging of said movable metallic conductor away from a grounding electrical stop member and into proximity with an overhanging location of said switch output conductor member while entering said normally closed electrical switching condition.

14. The method of performing electrical switching in a metallic conductor path of a radio frequency integrated circuit electrical device metallic conductor of claim 11 wherein a first of said movable metallic conductor electrical switching member and said switch output conductor member comprises a source of radio frequency energy and a second of said members comprises a radio frequency load connection and wherein said step of limiting capacitance-accomplished electrical signal coupling comprises one of the steps of shunt loading said source of radio frequency energy and shunt paralleling a signal load member.

15. The method of performing electrical switching in a metallic conductor path of a radio frequency integrated circuit electrical device metallic conductor of claim 11 wherein said radio frequency integrated circuit electrical device has an operating frequency in the range of integral numbers of gigahertz.

16. The method of performing electrical switching in a metallic conductor path of a radio frequency integrated circuit electrical device metallic conductor of claim 11 wherein said step of coupling radio frequency electrical signal between said movable metallic conductor-inclusive electrical switching member and a switch output conductor member using increased electrical capacitance coupling includes coupling signal through a capacitance increased by a factor of between fifty and two hundred times by said electrically closed switching position.

17. The method of performing electrical switching in a metallic conductor path of a radio frequency integrated circuit electrical device metallic conductor of claim 11 wherein said step of changing said switching member movable metallic conductor position with electrostatic force generated by an electrical potential switch control signal includes generating an electrostatic field using an electrical potential of less than twenty five volts.

18. The method of performing electrical switching in a metallic conductor path of a radio frequency integrated circuit electrical device metallic conductor of claim 11 further including the step of determining said spring tension of said spring tension-urged, electrically open first switching position by selecting characteristic parameters of said metallic conductor during fabrication of said integrated circuit.

19. The method of performing electrical switching in a metallic conductor path of a radio frequency integrated circuit electrical device metallic conductor of claim 11 wherein said signal path of a radio frequency integrated circuit electrical device comprises one of an inter stage signal coupling path within said integrated circuit, a signal output path of said integrated circuit and a signal gain controlling path within said integrated circuit.

20. Integrated circuit electrical device metallic signal conductor path electrical switching apparatus comprising:
   a lengthwise extended metallic signal conductor extending across a semiconductor layer surface of said integrated circuit;
   an arcuate movable metallic conductor-inclusive electrical switching element located in said metallic signal conductor and in electrical series with opposed ends of said signal conductor;
   a fixed position electrical switch output element also located in said metallic signal conductor and disposed at an end portion thereof on said semiconductor layer surface;

an end portion-removed section of said fixed position electrical switch output element being located within arcuate reach of said movable metallic conductor-inclusive electrical switching element;

said movable metallic conductor electrical switching element being electively disposable in either of spring tension-urged, electrically open and electrically closed switching positions of smaller and larger capacitance coupling respectively between said movable metallic conductor electrical switching element and said fixed position electrical switch output element;

electrostatic force generating electrical potential source means for moving said switching member movable metallic conductor arcuately from said electrically open switching position into said electrically closed switching position;

metal stopping member means selectively disposed in an opening swing arcuate path of said switching member movable metallic conductor for limiting spring tension urged switch opening arcuate travel and open switch element spacing gap of said movable metallic conductor electrical switching member in said electrically open switching position;

said metal stopping member means being disposed at zero signal electrical potential of said integrated circuit for shunt loading movable metallic conductor electrical switching element electrical signal to zero potential in said electrically open switching position. spring tension-urged.

21. The integrated circuit electrical device metallic signal conductor path electrical switching apparatus of claim 20 wherein said arcuate movable metallic conductor-inclusive electrical switching element is of a cantilever configuration.

22. The integrated circuit electrical device metallic signal conductor path electrical switching apparatus of claim 21 wherein said arcuate movable metallic conductor-inclusive electrical switching element and said lengthwise extended metallic signal conductor are of a single common metallization.

* * * * *